United States Patent [19]
Pan et al.

[11] Patent Number: 5,884,777
[45] Date of Patent: Mar. 23, 1999

[54] SIMULATED MOVING BED ABSORPTION SEPARATION PROCESS

[75] Inventors: Weizhong Pan; Yubing Wang; Wen Zhou; Yousong Li; Yusong Xue; Weimin Chen, all of Nanjing, China

[73] Assignee: Yangzi Petro-Chemical Corp. Sinopec, Nanjing, China

[21] Appl. No.: 817,201

[22] PCT Filed: Oct. 20, 1995

[86] PCT No.: PCT/CH95/00080

§ 371 Date: Jun. 4, 1997

§ 102(e) Date: Jun. 4, 1997

[87] PCT Pub. No.: WO96/12542

PCT Pub. Date: May 2, 1996

[30] Foreign Application Priority Data

Oct. 22, 1994 [CN] China ............................ 94116990.1
Dec. 7, 1994 [CN] China ............................ 94118796.9

[51] Int. Cl.$^6$ .................................................. B01D 15/00
[52] U.S. Cl. ........................ 210/672; 210/674; 210/690; 585/826; 585/828
[58] Field of Search .................. 210/674, 676, 210/690, 664, 672; 585/826, 827, 828

[56] References Cited

U.S. PATENT DOCUMENTS

| | | | |
|---|---|---|---|
| 2,985,589 | 5/1961 | Broughton et al. | 210/676 |
| 3,040,777 | 6/1962 | Carson et al. | 137/625.15 |
| 3,231,492 | 1/1966 | Stine et al. | 210/676 |
| 3,268,604 | 8/1966 | Boyd, Jr. | 585/821 |
| 3,268,605 | 8/1966 | Boyd, Jr. | 585/821 |
| 3,291,726 | 12/1966 | Broughton | 585/826 |
| 3,394,109 | 7/1968 | von der Emden et al. | 528/241 |
| 3,422,848 | 1/1969 | Liebman et al. | 137/625.15 |
| 3,626,020 | 12/1971 | Neuzil | 585/831 |
| 3,663,638 | 5/1972 | Neuzeil | 585/831 |
| 3,665,046 | 5/1972 | De Rosset | 585/831 |
| 3,686,342 | 8/1972 | Neuzil | 585/828 |
| 3,700,744 | 10/1972 | Berger et al. | 585/478 |
| 3,734,947 | 5/1973 | Ueno et al. | 560/64 |
| 3,997,620 | 12/1976 | Neuzil | 585/828 |
| 4,051,192 | 9/1977 | Neuzil et al. | 585/828 |
| 4,306,107 | 12/1981 | Broughton | 585/828 |
| 4,423,279 | 12/1983 | Kulprathipanja | 585/828 |
| 5,171,922 | 12/1992 | Anderson | 585/826 |

FOREIGN PATENT DOCUMENTS

| | | |
|---|---|---|
| 1047489A | 12/1990 | China . |
| 1049329A | 2/1991 | China . |
| 1051549A | 5/1991 | China . |
| 1064071A | 9/1992 | China . |
| 1022622C | 11/1993 | China . |
| 1022826C | 11/1993 | China . |

*Primary Examiner*—Ivars Cintins
*Attorney, Agent, or Firm*—Burns, Doane, Swecker & Mathis, L.L.P.

[57] ABSTRACT

Disclosed is a method for the adsorptive separation by utilizing an improved simulated moving bed. This invention provides an improved formula for the calculation of primary flush flowrate by correspondingly associating the primary flush flowrate with each connection line by introducting a volume factor and carring out sequential control so as to reduce the amount of the flush stream and increase product purity and yield.

13 Claims, 1 Drawing Sheet

SIMULATED MOVING BED ABSORPTION SEPARATION PROCESS

FIELD OF THE INVENTION

This invention relates to a method for adsorptively separating one or more components through the selectivity of an adsorbent from a mixture of feed containing both selectively adsorbed component A(containing one or more components) and a relatively less adsorbed component B(containing one or more components). More particularly, this invention relates to a method for separating a kind of isomer from a mixture of hydrocarbon feed containing several isomers. This invention specifically relates to a method for producing high-purity para-xylene through the improved adsorptive separation process from a mixture of feed containing para-xylene and its other isomers.

BACKGROUND OF THE INVENTION

It is well known that adsorptive separation is one of the separation methods widely adopted in the chemical industry, especially in petrochemical industry. For quite some time, this method has been adopted to separate a component which is difficult to be separated by other means from a mixture of feed containing various components.

In the prior art, there are abundant patent literatures describing methods for separating one kind of hydrocarbon from the other isomers. For instance, methods for separating para-isomers of monocyclic aromatics substituted by dialkyl group from other isomers, especially for separating paraxylene from other xylene isomers by employing a specific zeolite molecular sieve adsorbent to preferably adsorb para-isomers have been published in literatures of U.S. Pat. No. 3,626,5020, U.S. Pat. No. 3,663,638, U.S. Pat. No. 3,665,046, U.S. Pat. No. 3,700,744, U.S. Pat. No. 3,686,342, U.S. Pat. No. 3,734,47, U.S. Pat. No. 3,394,109, U.S. Pat. No. 3,997,620, CN1022622, CN1022826, CN10493294, CN1051549A, CN1064071 and CN1047489A in which benzene, toluene, chlorobenzene, fluoro-aromatics, halogen toluene, para-dialkylbenzene,diethyltoluene, and tetraline are respectively recommended as the desorbent depending on the composition of mixture of the feed.

A process of adsorptive separation may be effected both on a fixed bed or a moving bed, preferably on a simulated countercurrent moving bed system. For example, a simulated countercurrent moving bed system has been adopted for adsorptive separation in U.S. Pat. No. 2,985,589, U.S. Pat. No. 3,268,604 and U.S. Pat. No. 3,268,605 while a rotary valve for the system of simulated countercurrent moving bed has been disclosed in U.S. Pat. No. 3,040,777 and U.S. Pat. No. 3,422,848. Some drawbacks in the prior art, the objects of this invention and the scheme of settlement will be further explained hereinafter with reference to the accompanying drawing.

The drawing is a principle depiction of a continuous adsorptive separation system of a simulated countercurrent moving bed.

Referring to the drawing, a adsorptive separation system comprises four zones, consecutively as adsorption zone, purification zone, desorption zone and buffer zone. In the drawing, F represents a feed stream containing a selectively adsorbed component A and a relatively less adsorbed component B, D represents a desorbent stream, E represents an extract, i.e. a stream of desorbent containing the selectively adsorbed component A, R represents a raffinate, i.e. the remaining stream containing the relatively less adsorbed component B after desorption, $H_{(in)}$ and $H_{(out)}$ respectively represent an inflowing and an outflowing stream enriched in said desorbent for the primary flush stream for the lines connecting the adsorptive beds, X represents the secondary flush stream for the lines connecting the adsorptive beds, and M represents the simulated adsorbent moving direction shifted by the rotary valve. Zone I is between F and R wherein the charged feed contacts countercurrently with the adsorbent, and the selectively adsorbed component A shifts from the feed stream into the pores of said adsorbent, displacing the desorbent D from the pores at the same time. Thus, zone I is defined as adsorption zone. Zone II is between F and E. For the reason that the adsorbent adsorbs selectively adsorbed component A and a little amount of relatively less adsorbed component B as well, in zone II said adsorbent contacts with the stream containing only A and D coming from upstream of zone II, relatively less adsorbed component B is displaced gradually from the pores by selectively adsorbed component A and the desorbent D by means of appropriate adjustment of flow velocity of the stream in the zone. As the adsorbent has a stronger adsorption selectivity to component A than to component B, component A will not be completely displaced at the same time and thus will get purified in the zone. Zone II is consequently defined as purification zone. Zone III is between E and D wherein pure D contacts with the adsorbate purified in zone II and displace A from said adsorbent pores, thus this zone is defined as desorption zone. Zone IV is between D and R wherein the flowrate of D is defined so that D is made to flow upwards in the zone under flow control so as to prevent component B from getting into the stream in zone III to contaminate the extract. Thus, this zone is defined as buffer zone.

In operation, switching equipment, e. g. rotary valve, etc. is employed to recycle the inflowing and outflowing streams and shift the four zones in turn to realize simulation of adsorbent moving. During rotary valve switching, it is necessary to flush the residue out of the adsorptive bed connection lines to ensure purity and recovery of the purified component. Locations of $H_{(in)}$, $H_{(out)}$ and X are shown in the drawing and thus zones II and III are further divided into three more zones of II', II" and III'.

With regard to flowrate of $H_{(in)}$ and $H_{(out)}$, on one hand if the flowrate is set too small, the residue in the lines cannot be flushed away, which will subsequently affect the product purity and recovery; on the other hand, if the flowrate is too big, when the flush stream enriched in desorbent is drained through adsorptive beds after flushing the connection lines, adsorptive space of the adsorbent will be occupied by the desorbent in the flush stream, whereby weakening the adsorptive power of said adsorbent to the selectively adsorbed component, which will also result in the decreased purity and recovery of the selectively adsorbed component.

In the prior processes, the set flowrate $W_{H(in)}$ and $W_{H(out)}$ of primary flush stream to each adsorptive bed connection line is calculated based on the following formula (I):

$$W_{H(in)} = W_{H(out)} = 2V_L/T \tag{I}$$

wherein:

$V_L$ - - - volume of the longest connection line, $m^3$

T - - - time interval of rotary valve switching, h

Based on volumetric equilibrium of the adsorber, the following formulas can be adopted for calculating flowrate in each zone;

$$W_I = W_H + W_S + W_F$$

$$W_{II} = W_H + W_S$$

$$W_{II'} = W_S - W_X$$

$$W_{III} = W_S + W_E - W_X$$

$$W_{III'} = W_S + W_E + W_H - W_X$$

$$W_{IV} = W_D + W_H - W_D - W_X$$

wherein:

$W_H$ - - - flowrate of the primary flush stream
$W_X$ - - - flowrate of the secondary flush stream
$W_F$ - - - flowrate of the feed stream
$W_E$ - - - flowrate of the extract stream
$W_D$ - - - flowrate of the desorbent stream
$W_S$ - - - flowrate of the stream specified in zone II In an actual system, however, because of the different position of each bed spaced in the adsorber and different distance to the rotary valve, the volume of each line connecting bed with rotary valve varies a lot. For this reason, the calculation of the flowrate of primary flush stream for each line based on formula (I) in prior process will result in higher flush stream which will hence decrease the purity and recovery of the product.

SUMMARY OF THE INVENTION

The object of this invention is to provide an improved method of adsorptive separation on simulated moving bed to increase recovery and purity of product and reduce the flowrate of primary flush stream and production cost.

In the method according to the present invention, the flowrate of the primary flush stream to each adsorptive bed connection line is associated with the volume of each line to reduce the amount of the primary flush stream so as to overcome drawbacks of higher flowrate of flush stream and lower purity and lower recovery of the product, which are displayed by prior adsorptive separation process, and to realize the abovementioned object of this invention.

DETAILED DESCRIPTION OF THE INVENTION

Figure 1:
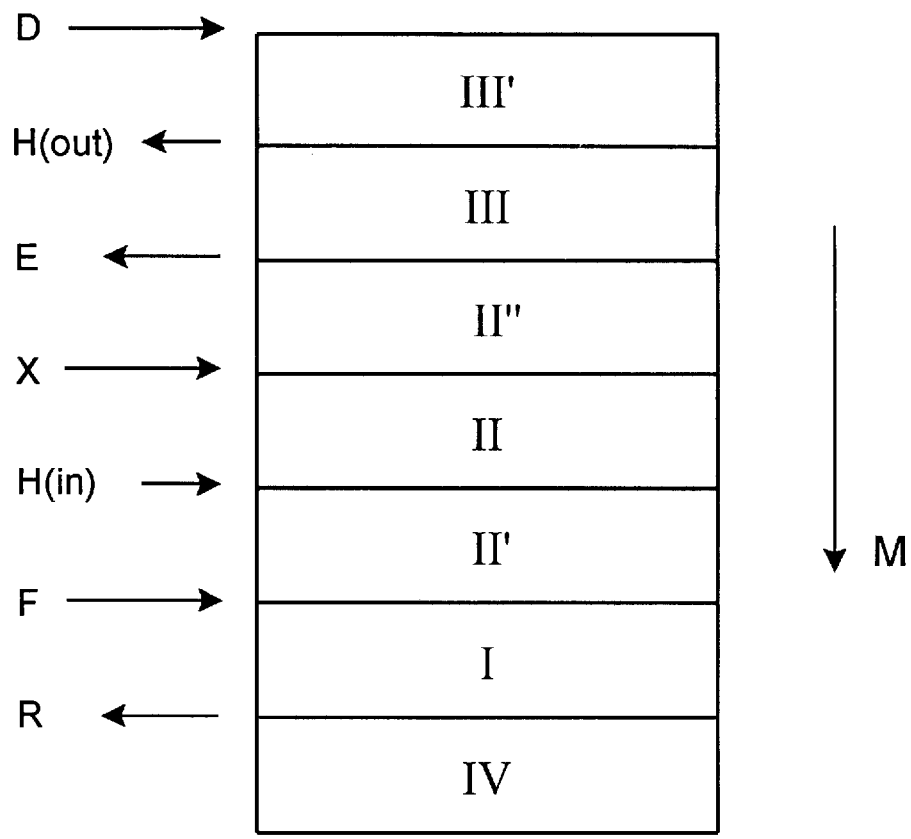

Referring to the drawing, this invention relates to a method to adsorptively separate a selectively adsorbed component from a relatively less adsorbed compoonent in a mixture of feed containing both the components by utilizing an improved adsorption system of simulated countercurrent moving bed. The method comprises the following steps:

Step 1) Adsorbing

A feed to be separated is made to contact in adsorption zone I countercurrently with the adsorbent which selectively adsorbs component A, leaving a raffinate R enriched in relatively less adsorbed component B.

Step 2) Purifying

The adsorbent adsorbs component A and a small amount of component B as well. This step is to let a portion of stream containing both component A and the desorbent contact, in purification zone II, with the adsorbate after step 1, displacing component B from the pores of said adsorbent, purifying component A.

Step 3) Desorbing

The desorbent contacts in desorption zone III with the adsorbate enriched in component A, desorbing the purified component A from said adsorbent pores to obtain a extraet E. A portion of the extract is used as the adsorbent for purification as mentioned hereinabove in step 2 and the remaining is sent to distillation. High purity product of component A is recovered and the desorbent is circulated for reuse.

Step 4) Buffering

In buffer zone IV, the stream of desorbent D is made to flow upwards under flowrate control, preventing the raffinate containing component B from getting into the stream in the desorption zone to contaminate the extract.

Step 5) Switching

In the process of adsorptive separation, the four steps mentioned hereinabove are made to repeat in turn by using a stream switch-over device. Each zone is made to become adsorption zone, purification zone, desorption zone and buffer zone successively, realizing cyclic moving of the four zones in the system. Switching devices employed in the preferred embodiment of this invention can be a rotary valve, a switching valve, or any equipment with a function of stream shifting Rotary valves for the above functions recommended in the U.S. Pat. Nos. 3,040,777 and 3,422,848 are incorporated herein by reference.

Step 6) Flushing

In the process of stream switch-over, it is necessary to flush the lines connecting adsorptive beds with switching device to remove the residue in the lines prior to introducing new streams into each zone. A solution enriched in desorbent is usually selected for flushing.

The flushing step is of utmost importance to the final recovery and purity of the product. The flowrate $2V_L/T$ of the primary flush stream adopted by the prior process will not only result in excessive flush stream and subsequently waste stream, but also have adsorptive spaces occupied by the desorbent in the flush stream, reducing the power of the adsorbent to selectively adsorbed component, and reducing the recovery and purity of the selectively adsorbed component.

The inventors discover that if the flowrate of the primary flush stream supplied to the lines connecting each bed is calculated and operated by the following formula (II), the above mentioned shortcomings can be overcome to realize economical flushing, increased recovery and purity of the selectively adsorbed component, and higher capacity of the entire adsorptive separation system.

$$W_{H(in)n} W_{H(out)n} = K_n \cdot V_L / T \qquad (II)$$

wherein:

$W_{Hn}$ - - - flowrate of the primary flush stream for flushing the line connecting the nth bed, m³/h
$K_n$ - - - volume factor of the nth connecting line, the value of which can be expressed by the following formula (III):

$$K_n = K' \cdot V_n / V_L \qquad (III)$$

wherein:

K' - - - coefficient of volume factor, the value of which is in the range of from 0.5 to 3.5
$V_L$ - - - volume of the longest conncetion line, m³
$V_n$ - - - volume of the nth connection line, m³
T - - - time interval of rotary valve switching, h In formula (II), the selection of $K_n$ is related, on one hand, to $V_n/V_L$ (different $V_n/V_L$ for different line volume), on the other hand, to the chosen coefficient K' of volume factor. The value of coefficient K' depends on the length, diameter and shape of a connection line. For lines having shorter length, bigger diameter and less bendings, smaller K' (0.5–2) is appropriate, e.g. 1~1.5. For lines having longer length, smaller diameter and more bendings, bigger K'(2~3.5) is suitable, e.g. 2.5~3.0. For lines of intermediate extent, coefficient K' of 2 is preferable.

By chosing an appropriate coefficient of the volume factor, the flowrate of the primary flushing stream can be set in the most reasonable way by having it associated with the volume of each connection line and adjusted with sequential control to assign different flushing flowrates to different connection lines, which can not only save flushing stream but also increase recovery and purity of the selectively adsorbed component.

By using the improved method of this invention and under the prerequisite of ensuring flushing effect, the flowrate of the primary flush stream can be set smaller so as to reduce the space originally occupied by the desorbent, getting more adsorptive space for desired product. In this way, the recovery can be increased by 4~5%, the purity by 0.1~0.2%,and the unit capacity indirectly by 3~5%.

The simulated moving bed system disclosed in this invention can comprise one or more adsorbers, each of which may contain any reasonable quantities of adsorptive beds , usually eight or more beds, e.g. 8~24 beds. Beds of integral multiple of eight are preferable, e.g. 24 beds.

The feed applicable for the simulated moving bed adsorption system of this invention can be any feed suitable for adsorptive separation. The feed can be a mixture of various components having different adsorptive properties produced in petrochemical process. Said mixture may include various paraffins and substituted paraffins, e.g. haloalkanes, cycloalkanes, olefines, etc., various aromatics and substituted aromatics, e.g. alkyl aromatics, halogenated aromatics, heterocyclic aromatics, etc., and alkyl amines, alkanols, alkyl ethers, alkyl esters, etc.

In the preferred embodiments of this invention, the feed to be separated may be various applicable paraffins or a mixture of $C_8$ and $C_9$ aromatics. In the specially preferred embodiment ,the feed is a mixture of various isomers of dialkyl benzene, especially xylene.

The adsorbent adopted in the simulated moving bed adsorption system used in this invention can be any applicable adsorbent that can separate the feed stream. Selection of adsorbent is primarily based on the properties and concentrations of various components in the feed, and the interaction of components with said adsorbent. Different natural or synthesized adsorbents can be chosen for different feed compositions, such as natural or synthesized zeolites, e.g. molecular sieves of X or Y type, activated alumina and silica gel, and moleculatr sieve adsorbents of aluminosilicate with different metallic cations by ion exchange developed since the last ten years.

The desorbent adopted in the present adsorptive separation system used in this invention can be any liquid which has a different adsorptive power as compared to already adsorbed component, and can displace the selectively adsorbed component from said adsorbent which can be continuously used in operation. The desorbent to be selected should be compatible with various components in the feed and the adsorbent, and can be used repeatedly after recovery by easy separation from those components by other means, e.g. distillation. The desorbent adopted in the present process includes various applicable paraffins, aromatics and their substituents.

Conditions for adsorptive separation comprise temperature ranging from ambient temperature to about 250° C.,with the range between 60° C. ~200° C. being preferred, and pressure ranging between 140 atmospheric pressures. Conditions for desorption are the same as those for adsorption.

The following examples are for the purpose of further demonstration on the effect of the adsorptive separation with decreased amount of primary flush stream involved in the preferred embodiment of this invention. However, the method in this invention is not limited to the examples illustrated herein. Exactly in reverse, the scope of this invention includes all methods of adsorptive separation with reduced amount of primary flush stream.

EXAMPLE 1

This example illustrates separation of feed containing para-xylene and its isomers using the following process conditions:

Composition of feed: p-xylene,o-xylene,m-xylene, ethylbenzene ,etc.

Adsorbent: X type zeolite molecular sieve containing potassium and barium

Desorbent: paradiethylbenzene

Primary flush stream H(in): solution enriched in paradiethyl- benzene

Temperature: 177° C.

Pressure: 0.88 MPa.

Flowrates of the feed stream through the adsorber (loaded 95%):

$$W_F = 224 m^3/h$$

$$W_D = 336 m^3/h$$

$$W_E = 132 m^3/h$$

$$W_X = 18 m^3/h$$

$$W_K = 446 m^3/h$$

Time interval of rotary valve switching was:

$$T = 101.4s = 0.0281 h$$

The adsorber contained 24 beds. Volumes of lines connecting each bed are shown in Table 1.

Selected value of the coefficient K' of volume factor was 2, volume factors $K_n$ of each bed connecting line were calculated according to $2V_n/V_L$,which are also shown in Table 1.

Based on the value T, volume $V_L$ of the longest bed connection line, and volume factors $K_n$ of each bed connection line, the flowrates $W_{H(in)n}$ and $W_{H(out)n}$ of the primary flush stream can be calculated by the formula:

$$W_{H(in)n}\ W_{H(out)n} = K_n\ V_L/T,$$

which are also shown in Table 1.

TABLE 1

Values $V_n$, $K_n$ and $W_{H(in)n}$ of bed connection lines

| | | | | | | | | |
|---|---|---|---|---|---|---|---|---|
| $V_n$ | 0.74 | 0.59 | 0.55 | 0.54 | 0.57 | 0.56 | 0.67 | 0.69 |
| $K_N$ | 1.50 | 1.20 | 1.10 | 1.10 | 1.20 | 1.10 | 1.40 | 1.40 |
| $W_{H(in)n}$ | 53.4 | 42.7 | 39.1 | 39.1 | 42.7 | 39.1 | 49.8 | 49.8 |
| $V_n$ | 0.68 | 0.68 | 0.71 | 0.77 | 1.00 | 0.85 | 0.70 | 0.71 |
| $K_N$ | 1.40 | 1.40 | 1.40 | 1.50 | 2.00 | 1.70 | 1.50 | 1.40 |
| $W_{H(in)n}$ | 49.8 | 49.8 | 49.8 | 53.4 | 71 | 60.5 | 53.4 | 49.8 |
| $V_n$ | 0.70 | 0.64 | 0.68 | 0.64 | 0.60 | 0.59 | 0.59 | 0.63 |
| $K_N$ | 1.40 | 1.50 | 1.40 | 1.30 | 1.20 | 1.20 | 1.20 | 1.30 |
| $W_{H(in)n}$ | 49.8 | 53.4 | 49.8. | 46.3 | 42.7 | 42.7 | 42.7 | 46.3 |

*$V_L$: volume of the longest connection line.

By associating $W_{H(in)}$ and $W_{H(out)n}$ shown in Table 1 with each line volume of the 24 bed connection lines respectively, adjustment on the flowrate of primary flush stream to each line can be realized by sequential control. When operation got stable, the recovery of p-xylene reached up to 95%, and the product purity 99.46%.

Comparative Example 1

Process conditions for comparative example 1 were as same as those for example 1, except for the values of $W_{H(in)}$ and $W_{H(out)}$ which were calculated based on the following formula:

$$W_{H(in)} = W_{H(out)} = 2V_L/T = 2 \times 1.00/0.0281 = 71 (m^3/h)$$

The recovery for p-xylene was 90%, preduct purity 99.3%.

By contrasting the primary flush flowrate for each line in example 1 with the flush rate 71m³/h for each line in comparative example 1, it is apparent that the amount of primary flush stream employed in the preferred embodiment of this invention is 15~45% less than that in the prior process, average 30% less or more. As the amount of flush stream in comparative example 1 is more than that in example 1, it will inevitably result in lower recovery of the selectively adsorbed component and lower product purity as well.

EXAMPLE 2

The process in Example 2 was carried out under the following parameters with all other conditions being as same as in example 1.

$$W_F = 235 \ m^3/h$$
$$W_D = 355 \ m^3/h$$
$$W_E = 140 \ m^3/h$$
$$W_X = 19 \ m3 \ h$$
$$W_K = 467 \ m^3/h$$

Time interval of rotary valve switching was:

$$T = 99.3 \ s = 0.0275 \ h$$

Selected value of the coefficient K' of volume factor was 1.8, volume factors $K_n$ of each line were calculated by $1.8 V_n/V_L$, which are shown in Table 2.

Based on the value T, volume $V_L$ of the longest bed connection line, and volume factors $K_n$ of each bed connection line, the flowrates $W_{H(in)n}$ and $W_{H(out)n}$ of the primary flush stream can be calculated by the formula $$W_{H(in)n} = W_{H(out)n} = K_n \cdot V_L/T,$$

which are also shown in Table 2.

TABLE 2

Another group of values $K_n$ and $W_{H(in)n}$ of bed connection lines

| $V_n$ | 0.74 | 0.59 | 0.55 | 0.54 | 0.57 | 0.56 | 0.67 | 0.69 |
|---|---|---|---|---|---|---|---|---|
| $K_n$ | 1.33 | 1.06 | 0.99 | 0.97 | 1.03 | 1.01 | 1.21 | 1.24 |
| $W_{H(in)n}$ | 48.4 | 38.5 | 36.0 | 35.3 | 37.5 | 36.7 | 44.0 | 45.1 |
| $V_n$ | 0.68 | 0.68 | 0.71 | 0.77 | 1.00 | 0.85 | 0.70 | 0.71 |
| $K_n$ | 1.22 | 1.22 | 1.28 | 1.39 | 1.80 | 1.53 | 1.26 | 1.28 |
| $W_{H(in)n}$ | 44.4 | 44.4 | 46.5 | 50.5 | 65.4 | 55.6 | 45.8 | 46.5 |
| $V_n$ | 0.70 | 0.64 | 0.68 | 0.64 | 0.60 | 0.59 | 0.59 | 0.63 |
| $K_n$ | 1.26 | 1.15 | 1.22 | 1.15 | 1.08 | 1.06 | 1.06 | 1.13 |
| $W_{H(in)n}$ | 45.8 | 41.8 | 44.4 | 41.8 | 39.3 | 38.5 | 38.5 | 41.1 |

By associating $W_{H(in)n}$ and $W_{H(out)n}$ shown in Table 2 with each line volume of the 24 lines respectively, adjustment on the flow of primary flush stream to each line can be realized by sequential control. When operation got stable, the recovery of p-xylene reached up to 96%, and the product purity 99.5%.

By contrasting example 2 with example 1, it is apparent that the recovery and purity of p-xyline have been further increased by further reducing the flow rates of primary flush stream.

Comparative Example 2

Process conditions for comparative example 2 were as same as those for example 2, except for that the primary flush stream flowrate $W_{H(in)n}$ and $W_{H(out)n}$ for all lines was 65.4m³/h, which are calculated based on formula (II). When operation got stable, the recovery of p-xylene was 90.2%, and the product purity 99.3%.

By contrasting the flowrates of primary flush stream for each bed connection line in example 2 with the flush rate of 65.4m³/h in comparative example 2, it is apparent that the amount of primary flush stream in the preferred embodiment of this invention is 15·46% less than that in the prior process, average 32% less or more.

EXAMPLE 3

This example illustrates the adsorptive separation process for a mixture of feed containing m-xylene and its isomers with the following process conditions:

Composition of feed: p-xylene, o-xylene, m-xylene, ethyl-benzene, etc.

Adsorbent: zeolite molecular sieve

Desorbent: toluene

Primary flush stream H(in): solution enriched in toluene

Temperature: 180° C.

Pressure: 0.90 MPa.

The adsorber contains 24 beds, and time interval of rotary valve switching was:

$$T = 90 s = 0.025 \ h$$

Selected value of coefficient K' of volume factor was 1.90, on which the flowrates of primary flush stream to each line were calculated. Sequential control was utilized to adjust the flowrates of primary flush stream to each line. When operation got stable, the recovery for m-xylene reaches up to 60%, and the product purity 98%.

Comparative Example 3

Process conditions for comparative example 3 were as same as those for example 3, except for that $W_{H(in)}$ and $W_{H(out)}$ were calculated by the formula:

$$W_{H(in)} = W_{H(out)} = 2V_L/T$$

The recovery for m-xylene was 51%, and the product purity 95.0%.

By contrasting example 3 with comparative example 3, we can notice that decreased amount of primary flush stream demonstrated in the preferred embodiment of this invention may greatly increase the recovery and purity of the product.

Although only a few examples and their comparisons are illustrated in this invention, this invention is not limited to the illustrations herein to those skilled in the art. Just the opposite, many changes and modifications could be made on this basis. The scope of the modification and changes will be defined in the following claims.

What is claimed is:

1. A method for adsorptively separating a selectively adsorbable component from a relatively less adsorbable component in a feed mixture using a simulated countercurrent moving bed adsorption system comprising a plurality of absorption beds, the method comprising the steps of:

(1) supplying a feed mixture containing a selectively adsorbable component A and a relatively less adsorbable component B to an adsorption zone I, wherein the feed mixture contacts countercurrently with an adsorbent, said adsorbent selectively adsorbing from the feed, component A and to a lesser extent component P in pores of the adsorbent, thereby forming an adsorbate and a raffinate, the raffinate being enriched in component B;

(2) contacting a stream containing component A and a desorbent with the adsorbate from step (1) in a purification zone II to displace component B from the pores of the adsorbent, thereby purifying component A in the pores of the adsorbent to provide a purified adsorbate;

(3) contacting a desorbent with the purified adsorbate from step (2) in a desorption zone III to desorb component A from the pores of the adsorbent, thereby providing an extract enriched in component A, a first portion of the extract being used as the stream in step (2) and distilling the remainder of the extract to provide a high purity product A;

(4) controlling the flowrate of a desorbent stream in a buffer zone IV to prevent the raffinate from entering the desorption zone III and contaminating the extract;

(5) cyclically rotating zones I, II, III and IV by employing a rotary valve stream switching device to recycle inflowing and outflowing streams and, during the switching, using a flush stream enriched in desorbent to flush out residue in lines connecting the adsorption beds, a primary flush stream flow rate $W_h$ for each bed being calculated according to the formula:

$$W_{H(in)n} = W_{H(out)n} = K_n \cdot V_L T$$

wherein:

$K_n$ is the volume factor of the line connecting the nth adsorption bed, the value of the factor being expressed by the formula:

$$K_n = K' \cdot V_n / V_L$$

wherein:

$V_n$ represents the volume of the nth connection line, measured in $m^3$;

$V_L$ represents the volume of the longest connection line, measured in $m^3$;

T represents the time interval of rotary valve stream switching, measured in hours; and K' represents the coefficient of volume factor of each connection line, which factor is from 0.5 to 3.5, wherein the flush stream flowrate for each flush stream is sequentially controlled in such a manner that a respective flush stream flowrate is adopted for each connection line.

2. The method according to claim 1, wherein the value of $K_n$ is $2 \cdot V_n / V_L$.

3. The method according to claim 1, wherein the feed mixture comprises a mixture of paraffins and isomers of substituted paraffins.

4. The method according to claim 1, wherein the feed mixture comprises a mixture of aromatics and isomers of substituted aromatics.

5. The method according to claim 4, wherein the aromatics comprise dialkyl benzene, dialkylphenol, dinitrobenzene, dihalogeno-benzene and dialkyl naphthalene.

6. The method according to claim 5, wherein the dialkyl benzene is para-xylene.

7. The method according to claim 6, further comprising recovering the para-xylene as a product.

8. The method according to claim 1, wherein the adsorbent is an X type zeolite, a Y type zeolite, or a crystalline aluminosilicate with a metal cation introduced by ion exchange.

9. The method according to claim 1, wherein the desorbent is a paraffin or a substituted paraffin, or an aromatic or a substituted aromatic, the desorbent being effective to displace the selectively adsorbed component, and being compatible with the adsorbent and the feed stream, and being readily separable from component A.

10. The method according to claim 1, wherein the adsorption system comprises one or more adsorbers.

11. The method according to claim 1, wherein the adsorption system comprises eight or more adsorption beds.

12. The method according to claim 11, wherein the number of the adsorption beds is an integral multiple of eight.

13. The method according to claim 1, wherein the adsorbent is a K—Ba—X X-type molecular sieve and the desorbent is paradiethylbenzene.

* * * * *